Aug. 28, 1934.  G. McMULLEN  1,971,571
SAFETY BELT
Filed April 5, 1933
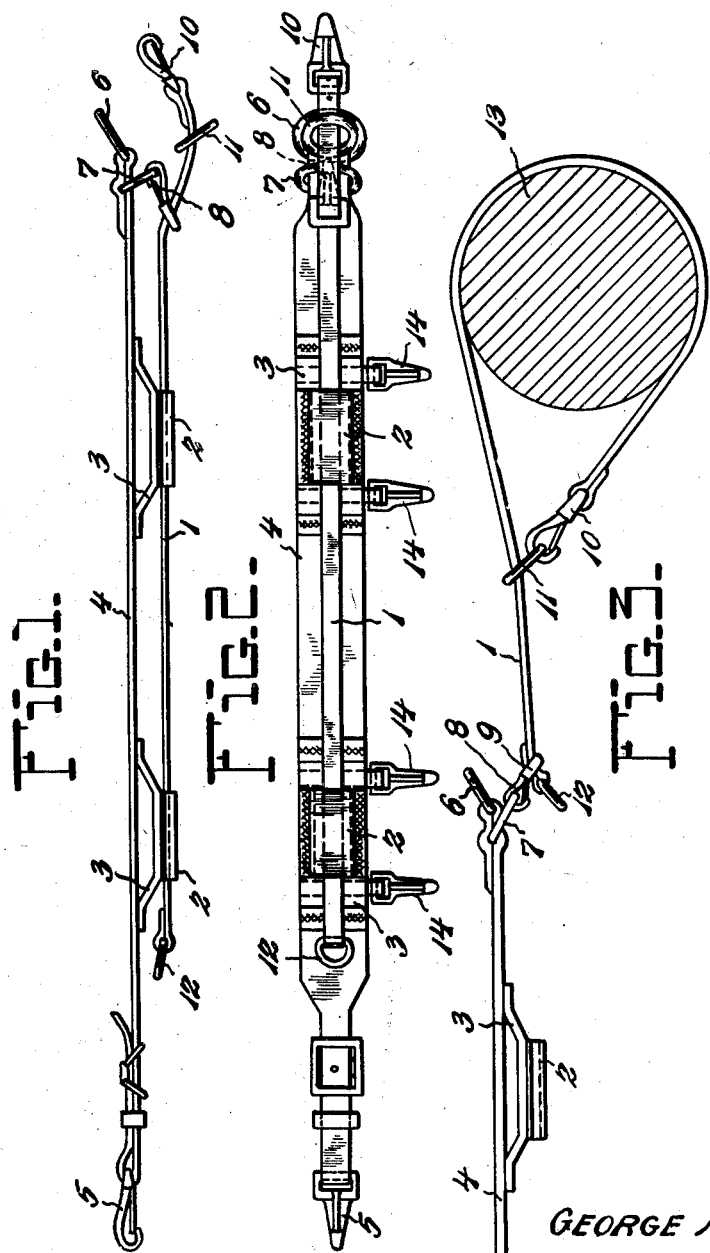
Inventor
GEORGE McMULLEN.
By Robert Cobb
Attorneys Patented Aug. 28, 1934

1,971,571

UNITED STATES PATENT OFFICE 1,971,571

SAFETY BELT

George McMullen, Saginaw, Mich.

Application April 5, 1933, Serial No. 664,642

8 Claims. (Cl. 227—8)

This invention has for its primary purpose the provision of instrumentalities designed to reduce the likelihood of personal injury to individuals such as firemen and the like engaged in hazardous occupations involving danger from falling from high locations.

More particularly, the invention provides a safety belt which is in the nature of an auxiliary belt attached to a regulation belt of the kind usually provided for firemen, linemen, and individuals engaged in occupations, the discharge of duties in which requires that the individual work in hazardous locations, often at considerable elevations.

This auxiliary belt is carried by the regulation belt in such a manner that it is at all times freely accessible to the wearer and is so constructed that, with a minimum of effort, it may be secured to any suitable object such as a post, railing, or the rung of a ladder, or to any similar object, in such manner as to reduce to a minimum extent, the likelihood of injury to the individual in the event that he should fall from his post of duty.

It will be understood, of course, that while the invention will be hereinafter described in connection with a belt for firemen, its use is by no means so restricted, and it will be understood that the details of the construction as herein illustrated in the accompanying drawing may be subject to considerable ranges of modifications without departing from the inventive concept.

In the accompanying drawing—

Figure 1 represents a top view of an improved belt constructed in accordance with the present invention.

Figure 2 is a front elevation of such belt.

Figure 3 is a top view showing the safety attachment, or auxiliary belt secured in position to a suitable object such as a post, railing, or the like.

As will be observed from the drawing, the improved belt comprises essentially an auxiliary belt or attachment, generally designated at 1, which is slidably secured in guides 2 mounted on holders 3 of a regulation belt 4, these holders being the conventional holders for small axes or other tools, the auxiliary belt 1 extending lengthwise along the front surface of the main or regulation belt 4.

The regulation belt 4 is illustrated as being provided with the usual snap hook 5 at one end adapted to be secured to the ring 6 at the other end for attachment around the body of the wearer.

Suitably secured to the belt 4 adjacent the ring 6 is a second ring 7 adapted to receive a snap hook 8 terminating in a ring 9 through which the auxiliary belt 1 passes, the ring 9 forming the means for permanently attaching the snap hook 8 to the auxiliary belt, as will become more clearly apparent hereinafter.

One end of the auxiliary belt is fastened permanently to the snap hook 10, and between the hook 10 and the hook 8 is positioned the ring 11.

To the other end of the auxiliary belt 1 is secured the ring 12. This ring is sufficiently small to permit the belt 1 to freely slip through the guides 2, but is sufficiently large to prevent its passing through the ring 9. This arrangement enables the auxiliary belt 1 to be moved relatively to the regulation belt 4 until the ring 12 comes into engagement with the ring 9, when further movement of the belt 1 in that direction is prevented. It will therefore be seen that the auxiliary belt 1 is permanently attached to the ring 9 and hook 8 which permits, however, removal of the auxiliary belt from the regulation belt should it be so desired to do, while at the same time effectively preventing any such accidental displacement of the auxiliary belt during use thereof as would cause a failure of the belt to act as a safety attachment in case of emergency.

In use, the belt 1 is wrapped around a post, railing, or similar suitable object indicated at 13, and the hook 10 is snapped into the ring 11 to secure the belt in position around the object to which it is attached.

Obviously the regulation belt 4 may be provided with the usual snap hooks 14 for carrying such tools as a hydrant wrench, spanner wrench, etc., as is well understood.

It will be seen that the device possesses a very high degree of simplicity of construction and possesses a high degree of utility as a safety attachment particularly in view of the fact that it is at all times instantly accessible to the wearer of the belt 4, and imparts a high degree of additional safety to an operator without unduly restricting his movements, it being obvious that there is no possibility of accidental detachment between the belts 1 and 4, since it is not possible for the ring 12 to slip through the ring 9, nor for the hook 8 to become separated from the ring 7 permanently secured to the belt 4.

Having thus described my invention, what I claim as new and desire to secure by Letters Patent of the United States, is—

1. A safety belt of the character described, comprising a main belt provided with the usual attaching means for securing the said main belt to the body of a wearer, an auxiliary belt carried by the main belt, means allowing relative movement between the main and auxiliary belts, means at one end of each belt attaching the auxiliary belt to the said main belt and preventing accidental complete displacement of the auxiliary belt from the said main belt, and devices carried by the auxiliary belt for attaching the said auxiliary belt to a suitable support.

2. A safety belt of the character described, comprising a main belt provided with the usual fastening means for securing the belt in position around the body of a wearer, guide devices mounted on the main belt, an auxiliary belt secured to the main belt and adapted to slide relatively thereto through the said guide devices, means at one end of the auxiliary belt and cooperating means at one end of the main belt for limiting the relative movement between the auxiliary and main belts to prevent accidental complete displacement therebetween, and attaching devices secured to the auxiliary belt for attaching the same to a supporting structure.

3. A safety belt of the character described, comprising a main belt provided with fastening devices for attaching the main belt around the body of a wearer and having the usual tool holders spaced along the front thereof, guide means mounted on the said tool holders, an auxiliary belt normally mounted in the said guide means, and freely slidable relatively thereto, a ring secured to one end of the auxiliary belt sufficiently small to freely pass through the said guide means upon relative displacement of the main and auxiliary belts, a ring permanently secured to the main belt adjacent one end thereof, a snap hook terminating in a ring mounted upon the auxiliary belt, said hook being adapted to engage the ring on the main belt, the said ring in which the hook terminates being sufficiently small to prevent passage therethrough of the ring end of the auxiliary belt, whereby said snap hook is permanently attached to the auxiliary belt and limits the amount of movement thereof relatively to the main belt, and fastening devices on the auxiliary belt adapted to secure the auxiliary belt to a suitable support, the said fastening devices including a snap hook secured to the end of the auxiliary belt, and a ring adjustably mounted on the auxiliary belt adapted to engage the said snap hook.

4. A safety belt of the character described, comprising a main belt provided with fastening devices for attaching the main belt around the body of a wearer and having the usual tool holders spaced along the front thereof, guide means mounted on the said tool holders, an auxiliary belt normally mounted in the said guide means, and freely slidable relative thereto, a ring secured to one end of the auxiliary belt sufficiently small to freely pass through the said guide means upon relative displacement of the main and auxiliary belts, a ring permanently secured to the main belt adjacent one end thereof, a snap hook terminating in a ring mounted upon the auxiliary belt, said hook being adapted to engage the ring on the main belt, the said ring in which the hook terminates being sufficiently small to prevent passage therethrough of the ring end of the auxiliary belt, whereby said snap hook is permanently attached to the auxiliary belt and limits the amount of movement thereof relatively to the main belt, and fastening devices on the auxiliary belt adapted to secure the auxiliary belt to a suitable support.

5. A safety belt of the character described, comprising a main belt provided with the usual attaching means for securing the said main belt to the body of a wearer, an auxiliary belt carried by the main belt, means allowing relative movement between the main and auxiliary belts, means at the respectively remote ends of said belts attaching the auxiliary belt to the said main belt and preventing accidental complete displacement of the auxiliary belt from the said main belt, and devices carried by the auxiliary belt for attaching the said auxiliary belt to a suitable support.

6. A safety belt of the character described, comprising a main belt having fastening means for attaching the same about the body of a wearer thereof, guide means on said main belt, an auxiliary belt normally mounted in said guide means and freely slidable relatively to said main belt and completely withdrawable from said guide means, means separate from said guide means for securing said auxiliary belt to said main belt while permitting such sliding movements of said auxiliary belt, said last mentioned means constituting means for preventing complete displacement of said auxiliary belt when so withdrawn from said guide means, and means on said auxiliary belt for attaching the same to a supporting member.

7. A safety belt of the character described, comprising a main belt having fastening means for attaching the same about the body of a wearer thereof, guide means on said main belt, an auxiliary belt normally mounted in said guide means and freely slidable relatively to said main belt and completely withdrawable from said guide means, means separate from said guide means for securing one end of said auxiliary belt to said main belt incident to withdrawal of said auxiliary belt from said guide means while permitting such sliding movements of said auxiliary belt, said last mentioned means constituting means for preventing complete displacement of said auxiliary belt when so withdrawn from said guide means, and means on said auxiliary belt for attaching the same to a supporting member.

8. A safety belt of the character described, comprising a main belt having fastening means for attaching the same about the body of a wearer thereof, guide means on said main belt, an auxiliary belt normally mounted in said guide means and freely slidable relatively to said main belt and completely withdrawable from said guide means, means separate from said guide means for securing said auxiliary belt to said main belt while permitting such sliding movement of said auxiliary belt, said last mentioned means constituting means for preventing complete displacement of said auxiliary belt when so withdrawn from said guide means, and means on said auxiliary belt for attaching the same to a supporting member, said latter means comprising a ring loosely carried by said auxiliary belt and freely slidable thereon, and a connecting member on the free end of said auxiliary belt for cooperation with said ring in securing the auxiliary belt to the supporting member as aforesaid.

GEORGE McMULLEN.